(12) United States Patent
Christensen et al.

(10) Patent No.: US 6,314,868 B1
(45) Date of Patent: Nov. 13, 2001

(54) DIRECT AND INDIRECT OUTDOOR COOKER

(75) Inventors: David M. Christensen, O'Fallon, IL (US); John A. Hart, Sunset Hills, MO (US); Wayne E. Thuenemann, New Baden, IL (US)

(73) Assignee: Empire Comfort Systems, Inc., Belleville, IL (US)

( * ) Notice: Subject to any disclaimer, the term of this patent is extended or adjusted under 35 U.S.C. 154(b) by 0 days.

(21) Appl. No.: 09/817,937

(22) Filed: Mar. 27, 2001

(51) Int. Cl.[7] .................. A23L 1/00; A47J 37/00; A47J 37/06; A47J 37/07; F24C 1/16
(52) U.S. Cl. .................. 99/340; 99/401; 99/444; 99/445; 99/447; 99/450; 126/25 R; 126/41 R
(58) Field of Search .............. 99/339, 340, 400, 99/401, 444–450, 473–476, 482, 483; 126/25 R, 41 R, 273 R, 275 R, 9 R, 9 A, 9 B, 390, 152 B, 39 K, 39 C, 39 R, 39 J, 39 E; 219/400, 401; 426/505, 523

(56) References Cited

U.S. PATENT DOCUMENTS

| | | | |
|---|---|---|---|
| 4,089,258 | * | 5/1978 | Berger ........................ 99/339 |
| 4,446,776 | * | 5/1984 | Gelfman ....................... 99/401 |
| 4,562,827 | * | 1/1986 | Cerola ........................ 126/41 R |
| 5,121,738 | * | 6/1992 | Harris ........................ 126/25 R |
| 5,168,796 | * | 12/1992 | Porton et al. ................. 99/340 |
| 5,363,752 | | 11/1994 | Weil . |
| 5,368,009 | * | 11/1994 | Jones ........................ 126/41 R |
| 5,481,965 | * | 1/1996 | Kronman ...................... 99/340 |
| 5,529,798 | | 6/1996 | Clark et al. . |
| 5,617,778 | * | 4/1997 | Schroeter et al. ............. 99/447 X |
| 5,782,230 | | 7/1998 | Linnebur et al. . |
| 5,890,422 | | 4/1999 | Clark et al. . |
| 5,911,812 | | 6/1999 | Stanek et al. . |
| 6,024,081 | * | 2/2000 | Libertini, Jr. ............... 99/445 X |
| 6,102,029 | * | 8/2000 | Stephen et al. ............... 126/41 R |
| 6,158,426 | * | 12/2000 | Wardell ...................... 126/25 R |
| 6,187,359 | * | 2/2001 | Zuccarini .................... 99/447 X |
| 6,205,996 | * | 3/2001 | Ryan ......................... 99/445 X |

* cited by examiner

Primary Examiner—Timothy F. Simone
(74) Attorney, Agent, or Firm—Howell & Haferkamp, LC

(57) ABSTRACT

The present invention pertains to an outdoor cooker or barbeque that cooks food by providing direct or indirect heat from a heat source of the cooker to the food. The outdoor cooker has a gas or charcoal heat source that provides direct and indirect heat to foods supported on a cooking surface of the grill by operation of a plurality of parallel louvers between the heat source and grill that are moved between first, upright positions of the louvers that provide direct heating of the food and second, angled relative positions of the louvers that provide indirect heating of the food.

32 Claims, 3 Drawing Sheets ns are basically suspended between the front and back side-walls by their pivot pins so that they hang in vertical or uprightly oriented positions with their first longitudinal
DIRECT AND INDIRECT OUTDOOR COOKER

BACKGROUND OF THE INVENTION (1) Field of the Invention

The present invention pertains to an outdoor cooker or grill that cooks food by providing direct or indirect heat from a heat source of the grill to the food. In particular, the present invention pertains to an outdoor cooker that has a gas or charcoal heat source that provides direct and indirect heat to foods supported on a cooking surface of the grill by operation of a louver assembly. The louver assembly is added to the grill and is comprised of a manual actuator and a plurality of louvers. Movement of the actuator moves the plurality of louvers between first, upright positions of the louvers that provide direct heating of the food and second, angled positions of the louvers that provide indirect heating of the food.

(2) Description of the Related Art

The typical outdoor cooker or barbecue is basically comprised of a base that encloses a source of heat, a grill that functions as the cooking surface of the outdoor cooker and a cover that protects the interior components of the outdoor cooker when not in use and can optionally be used in cooking. Outdoor cookers are provided in a variety of configurations but are most often given circular or rounded configurations or rectangular or box-shaped configurations. The rounded cookers have a generally semi-spherical base comprised of a bottom wall and a single sidewall that extends around the bottom wall. The box-like cookers have a box shaped base with a bottom wall and four sidewalls surrounding and extending upwardly from the bottom wall. The sidewalls of both cooker configurations support the grill cooking surface above the base bottom wall and above an interior volume of the base that is dimensioned to accommodate a source of heat. In outdoor cookers the common sources of heat include charcoal bricks or briquettes and gas heat.

A disadvantage encountered in using outdoor cookers that employ either charcoal or gas as a heat source is adjusting the heat of the source to achieve the desired cooking rate for food. The cooking heat of charcoal cookers can be adjusted by adjusting the amount of charcoal used as fuel and, in some cookers, adjusting the opening of air vents in the base of the cooker. The cooking heat of gas cookers can be adjusted by adjusting the flow of gas to the cooker.

In both types of cookers the foods can be cooked with the cover removed from the base to allow the heat source to sear or quickly cook the food on the grill on one side before turning or flipping the food to allow searing as quickly cooking the food on its opposite side. Alternatively, the food can be cooked with the cover in place on the cooker where the heat source of the grill will quickly cook the surface of the food resting on the grill cooking surface and will gradually bake or cook by convection the opposite surface of the food. However, in both situations of cooking with or without the cover of the grill in place, the bottom surface of the food resting on the grill cooking surface is subjected to the direct heat of the heat source and cooks quickly, and in many situations cooks at a faster rate than desirable.

Some outdoor cookers have been developed that include drip pans that can be inserted between the source of heat and the grill cooking surface when it is desirable to cook food by indirect heat, and then removed from between the source of heat and the grill cooking surface when it is desirable to cook food with direct heat. In addition, some cookers have been designed with an elaborate system of shutters, moveable channels or heat deflector plates that are component parts of the interior of the outdoor cooker that can be moved between opened positions where they allow direct heat to the grill cooking surface and closed positions where they provide indirect heat to the grill cooking surface. However, the elaborate constructions of these heat controlling mechanisms contributes significantly to the overall cost of the outdoor cooker and to the complexity or difficulty in assembling the component parts of the cooker.

SUMMARY OF THE INVENTION

What is needed to overcome the disadvantages associated with the prior art outdoor cookers is a mechanism that can be easily assembled to a cooker without significantly increasing its cost of manufacture and can be easily operated to enable the cooker to be used in both the direct and indirect cooking of food. The above set forth objectives are achieved by the construction of the direct and indirect outdoor cooker of the present invention.

In the preferred embodiment, the cooker has a box shaped configuration and a gas burner as its heat source, although the novel features of the cooker are equally well suited for use in a cooker having a rounded configuration and employing charcoal or other burning fuel as its heat source. Much of the construction of the direct and indirect outdoor cooker of the invention is typical of outdoor cookers. It includes a base having a rectangular bottom wall and four sidewalls that extend upwardly from the edges of the bottom wall. The interior volume of the base accommodates a heat source, in the preferred embodiment a gas burner that is adjusted by manual controls that regulate the supply of gas to the burner to adjust the burner flame. A grill having a cooking surface is supported on the base sidewalls above the burner. A cover having a complementary configuration to the base is removably positioned on top of the base covering the grill cooking surface and enclosing the interior volume of the base. The cover may be completely removable from the base or can be hinged to the back sidewall of the base.

The mechanism that enables direct and indirect cooking of food by the cooker of the invention is provided in the base interior between the grill cooking surface and the gas burner. The mechanism is basically comprised of a plurality of louvers and a manual actuator that controls movement of the louvers.

Each of the louvers is substantially identical to the others and has a flat, rectangular configuration with a longitudinal length between opposite first and second ends of the louvers. Each louver has a width across its longitudinal length with first and second longitudinal edges on opposite sides of the width. First and second pivot pins project from the respective first and second ends of the louvers. The pivot pins are coaxial and are positioned on the louvers in off-center positions relative to the width of the louvers, slightly closer to the first longitudinal edges of the louvers than the second longitudinal edges.

Each of the plurality of louvers are mounted in the interior of the cooker base by their pivot pins being supported on opposite front and back sidewalls of the base. The louvers are basically suspended between the front and back sidewalls by their pivot pins so that they hang in vertical or uprightly oriented positions with their first longitudinal edges over their second longitudinal edges. The first positions of the plurality of louvers where they are oriented uprightly is employed when direct heat cooking is desired. The louvers are moved by the actuator to their second positions where the louvers are angled relative to each other when indirect cooking is desired.

The actuator of the louvers is mounted between the left and right sidewalls of the cooker base beneath the plurality of louvers. The actuator is basically a bar that extends beneath the louvers and is mounted to the cooker sidewalls for pivoting movement. In the preferred embodiment, the bar is formed of a deformed rod having ends mounted in holes provided in the left and right sidewalls of the cooker base for pivoting movement of the rod about a pivot axis that passes through the holes. Inside the base interior volume an intermediate portion of the rod is bent eccentrically from the pivot axis of the rod. A plurality of wedges are secured to the bar intermediate portion and function as start up edges of the actuator. The positions of the wedges correspond to gaps between adjacent pairs of louvers suspended in the base interior. One end of the bar rod extends outside the base and is bent to form a manual handle of the actuator. Manipulating the handle between first and second positions causes the bar to pivot between first and second positions in the base interior and in turn causes the plurality of louvers to move between their first and second relative positions.

The grill grid that provides the cooking surface of the outdoor grill is supported on two or more of the base sidewalls spaced above the plurality of louvers which in turn are positioned above the heat source of the grill.

In operation of the direct and indirect outdoor cooker of the invention, when it is desired to provide direct heat from the heat source to food supported on the grill cooking surface the handle of the actuator is positioned in its first position. This causes the bar and the wedge members of the actuator to completely disengage from contact with the louvers. In turn, the louvers are free to pivot to their first relative positions by force of gravitation alone. In the first positions the louvers are suspended by their pivot pins between the opposite front and back sidewalls of the cooker and are oriented uprightly with their first longitudinal edges over their second longitudinal edges. This provides the greatest spacing between the louvers and enables the heat from the heat source to pass freely between the uprightly oriented louvers to the food supported on the grill cooking surface for direct cooking of the food.

Should it be desired to change the grill from direct cooking to indirect cooking, the manual handle of the actuator is moved from its first position to its second position. This causes the bar of the actuator in the interior of the cooker base to move from its first position to its second position. As the bar moves from its first position to its second position the wedge members on the bar come into contact with the second longitudinal edges of the louvers initiating the movement of the second longitudinal edges of adjacent louvers away from each other and initiating pivoting movement of the louvers from their first positions toward their second positions. As rotation of the handle from its first position to its second position continues, sliding movement of the wedges across the second longitudinal edges of the louvers continues, causing the louvers to continue to move toward their second positions where they form angles between adjacent louvers. Subsequently, the bar intermediate portion comes into contact with the second longitudinal edges of the louvers as the manual handle is continued to be moved toward its second position. The bar intermediate portion now causes the second longitudinal edges of adjacent pairs of louvers to continue to pivot toward the second positions of the plurality of louvers. When the handle reaches its second position the bar's engagement with the second longitudinal edges of the louvers holds the louvers in their second relative positions. In the second positions adjacent pairs of louvers are oriented at angles included between the adjacent louvers. The angles are arranged in an alternating pattern above and below the plurality of louvers across the base interior volume from the left or right hand sidewall to the opposite side wall. In the second, angled positions of the louvers the first longitudinal edges of the louvers of are spaced from each other and the second longitudinal edges of the louvers are spaced from each other leaving gaps between adjacent louvers that permit a restricted amount of direct heat to pass upwardly between the louvers and that allow juices from cooking food to pass downwardly between the louvers. The majority of the heat produced by the grill heat source is obstructed by the widths of the plurality of louvers and thereby the food supported on the grill cooking surface is heated by indirect heat from the heat source.

The plurality of louvers and their actuator described above provide an inexpensive to manufacture and easily assembled mechanism for enabling an outdoor cooker to operate with direct or indirect heating of cooking food. The simplified constructions of the plurality of louvers and their actuators can easily be incorporated into the cooker during its manufacture and can also be easily retrofit to an existing cooker.

BRIEF DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENT

Figure 1:
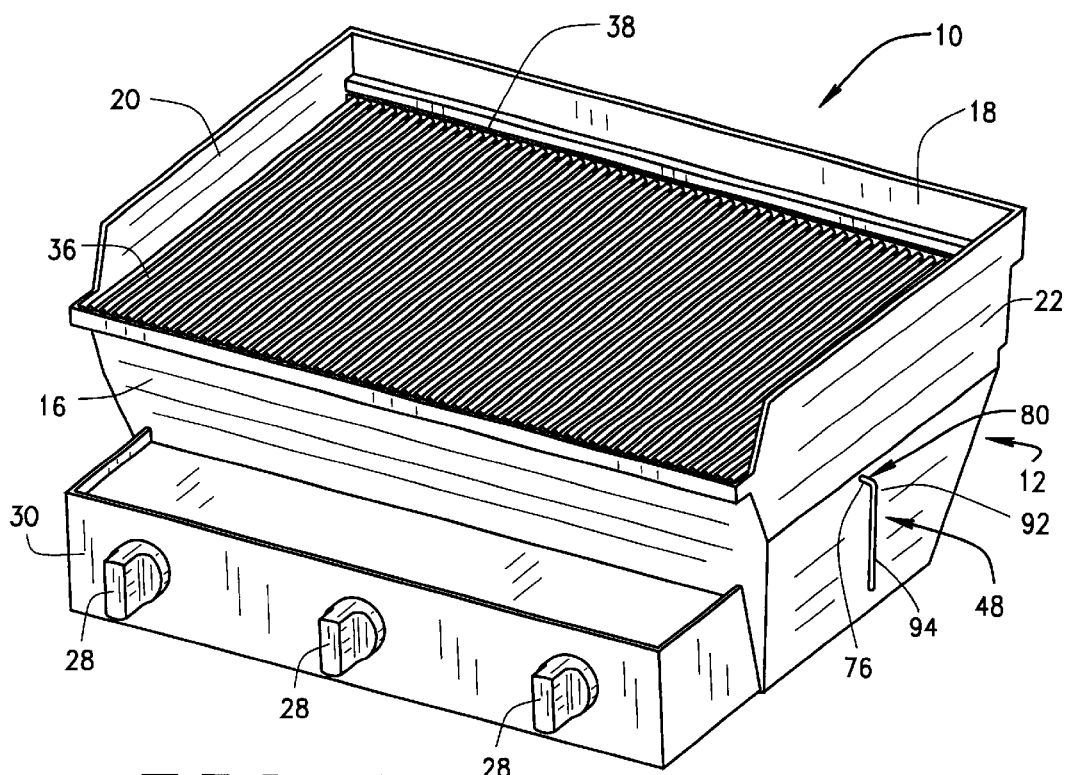
FIG. 1 is a perspective view of a typical outdoor cooker or barbecue that may employ the direct and indirect heating apparatus of the invention.

The direct and indirect outdoor cooker 10 of the present invention is shown in FIG. 1. As shown in FIG. 1, the cooker 10 has a general rectangular or box shaped configuration that is common to many outdoor cookers of the prior art. However, the box shaped configuration of the cooker shown in FIG. 1 is illustrative only and the novel features of the invention that enable it to directly and indirectly cook food are equally well suited for use in cookers having circular or rounded configurations as well as other configurations from that shown in FIG. 1. In addition, the cooker 10 shown in FIG. 1 is shown with its cover removed. In the preferred embodiment the cooker 10 will also have a cover having a complementary configuration to the box shape of the cooker that can be removably positioned on the top of the cooker covering and enclosing its interior. The cover may be completely removable from the cooker or may be hinged to the back of the cooker as viewed in FIG. 1 for moving between open and closed positions relative to the top of the cooker as is typical in many prior art outdoor cookers.

The cooker 10 is basically comprised of a base 12 that gives the cooker its box shaped configuration. The construction of the base 12 is common in many prior art cookers. As viewed in FIGS. 1–4, the base 12 has a generally rectangular bottom wall 14 and four side walls that extend upwardly from the bottom wall. The four side walls include a front wall 16 and an opposite rear wall 18, and left 20 and right 22 side walls as viewed in FIGS. 1–4. The base bottom wall and four side walls may be stamped from a single sheet of metal or may be of molded metal as is typical in outdoor cooker constructions. The bottom wall and the four side walls of the base surround and contain an interior volume 24 of the base that is dimensioned to accommodate a source of heat for the outdoor cooker. The source of heat may be a burning fuel such as charcoal bricks or briquettes or may be a gas burner. For illustrative purposes, the source of heat shown in the drawing figures are gas burners 26 positioned in the interior volume 24 of the base just above the base bottom wall 14. Gas supplied to and emitted by the burners 26 is controlled by a series of manual knobs 28 that adjust gas supplying valves (not shown) mounted in a control counsel 30 on the front wall 16 of the base. Because the operation of the knobs 28 and their associated valves in supplying gas to the burners 26 is known in the prior art, it is not described here in detail. Again however, it is emphasized that the gas burners 26 are only one source of heat for the direct/indirect outdoor cooker 10 of the invention and other known sources of heat may also be employed in the cooker.

Figure 4:
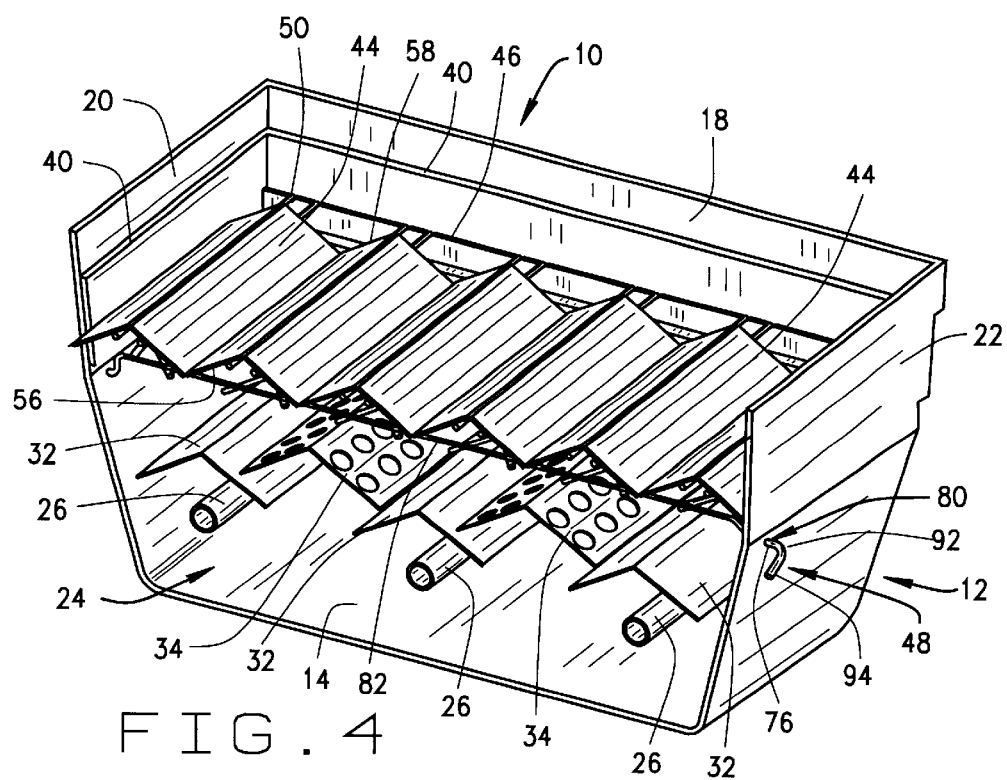
FIG. 4 is a cross section of the cooker as shown in FIG. 3 illustrating the positions of the louvers when in their second positions and the actuator of the invention employed in moving the louvers between their first and second positions.

In the cross section view of FIG. 4, a series of deflector plates 32, 34 can be seen supported in the grill interior volume 24 just above the gas burners 26. These include solid or continuous plates 32 positioned just above the gas burners 26 and perforated plates 34 positioned between the solid plates. The function of these plates is to prevent juices from the cooking food from dripping directly onto the burners 26 and producing flare ups of flames that could potentially burn the food being cooked by the cooker.

As seen in FIG. 1, a grill grid cooking surface 36 is supported by the grill side walls above the heat source of the gas burners 26 of the grill. In the embodiment shown, the cooking surface 36 has a rectangular configuration that extends entirely over the interior volume 24 of the base and the gas burner heat source 26 contained in the base interior. The grill grid cooking surface 36 has a rectangular peripheral edge 38 complementary to the rectangular configuration of the base 12. The edge 38 rests on a peripheral shoulder ledge 40 that extends around the interior of the base side wall 16, 18, 20, 22, and thereby supports the cooking surface 36 above the grill interior volume 24 and the gas burner heat source 26.

The construction of the direct and indirect outdoor cooker 10 of the invention described to this point is, for the most part, conventional. Added to this cooker construction is the mechanism of the invention that enables direct and indirect cooking of food by the cooker. The mechanism of the invention is made a part of the cooker construction with only minor additions to the conventional cooker construction described above, and thereby the mechanism of the invention can be easily added to the existing construction of a cooker without significantly increasing its costs of manufacture. Additionally, because the mechanism of the invention is so easily adapted to the typical construction of an outdoor cooker, the mechanism of the invention could also be provided as a separate kit that is retrofit to an existing cooker to enable it to perform the direct and indirect cooking of food enabled by the mechanism of the invention.

Figure 2:
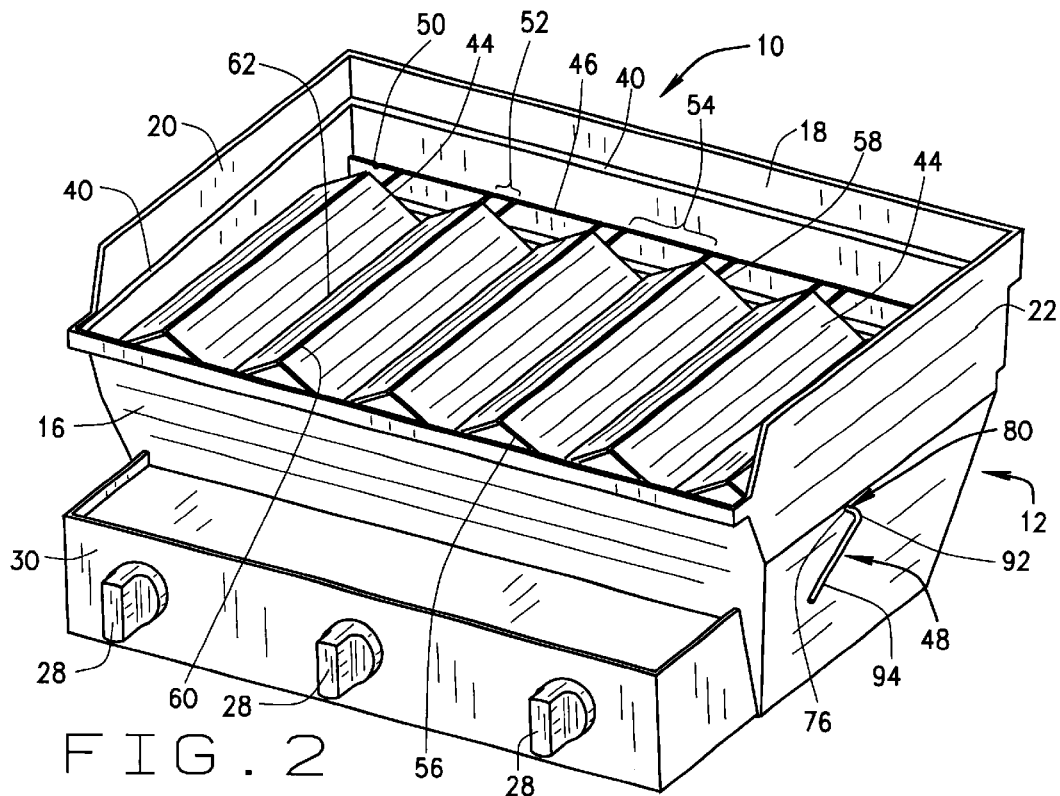
FIG. 2 is a perspective view of the cooker of FIG. 1 showing its grill grid cooking surface removed and the louvers of the invention in their second relative positions.
Figure 3:
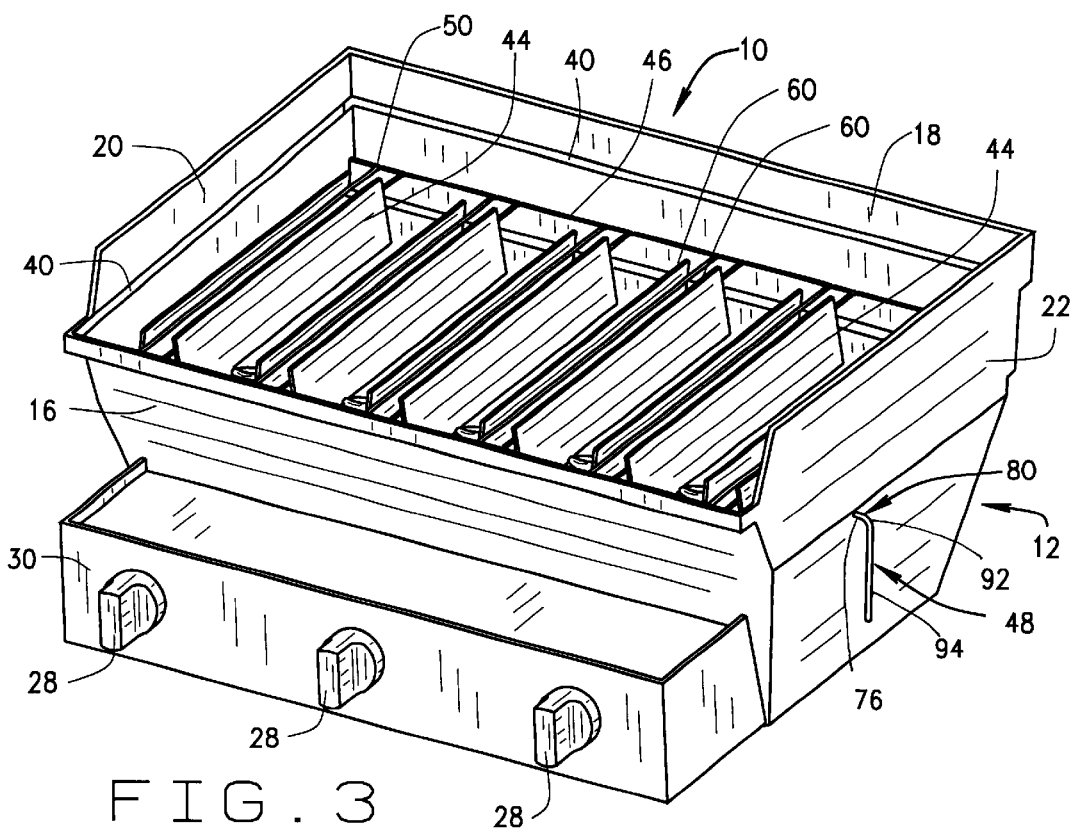
FIG. 3 is a view similar to that of FIG. 2 but showing the louvers of the invention in their first relative positions.

The direct and indirect outdoor cooker apparatus of the invention is basically comprised of a plurality of louvers 44 that are supported on a pair of shoulders 46 and are moved between first and second relative positions by a manual actuator 48. In the illustrative embodiment the shoulders 46 are mounted to the interior surfaces of the base front wall 16 and rear wall 18. Only the shoulder 46 mounted to the base rear wall 18 is visible in the drawing figures and can be seen in FIGS. 2–4. It should be understood that a like shoulder is mounted to the interior surface of the base front wall 16 directly opposite the shoulder 46 shown mounted to the base rear wall 18. The shoulder 46 is basically a rectangular strip of metal secured to the base rear wall 18 by welding, by fasteners or by other equivalent means. A top edge of the shoulder 46 is formed with pluralities of pairs of half circle indentations 50. As seen in FIGS. 2–4, the indentations 50 are arranged in pairs where the indentations of each pair are spaced a first distance 52 from each other and adjacent indentations of adjacent pairs are spaced a second distance 54 from each other, where the second distance 54 is larger than the first distance 52.

Figure 5:
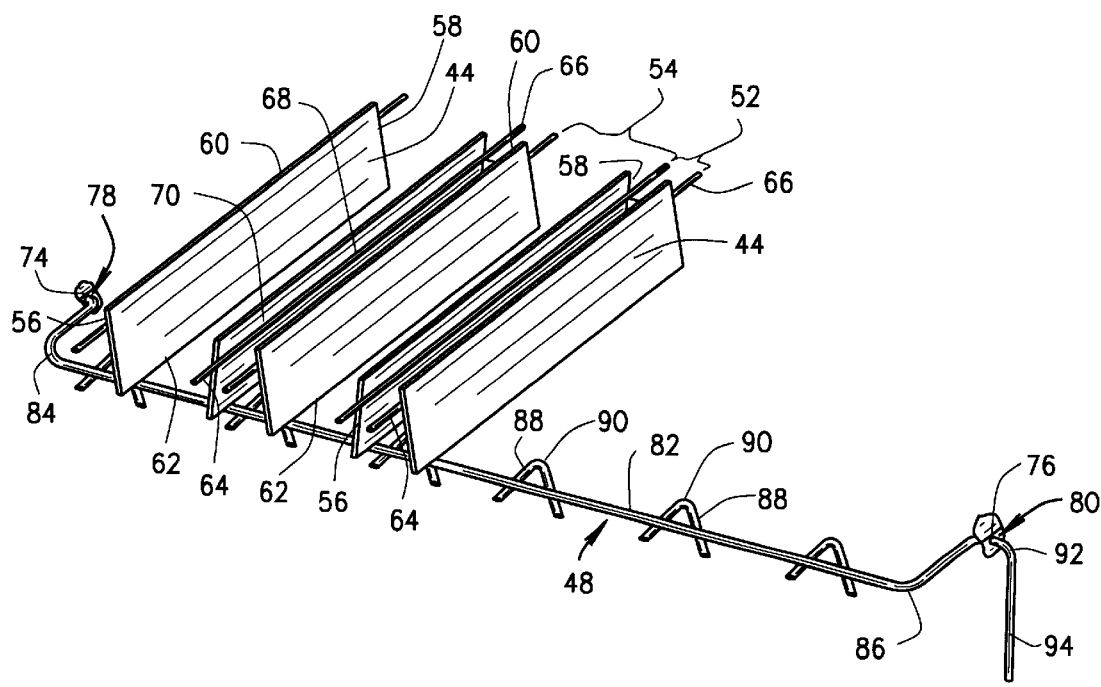
FIG. 5 is a partial view of the louvers and the actuator of the invention removed from the interior of the cooker.

Each of the louvers 44 of the plurality of louvers is substantially identical to the others. FIG. 5 shows several of the louvers removed from the interior of the base. Each of the louvers has a general rectangular configuration with a longitudinal length between opposite first 56 and second 58 parallel, end edges. In the preferred embodiment each of the louvers is formed from a flat metal plate. Each louver has a width across its longitudinal length with opposite first 60 and second 62 parallel, longitudinal edges on opposite sides of its width. A first, forward pivot pin 64 projects from the first end 56 of the louver and a second, rearward pivot pin 66 projects from the second end 58 of the louver. The pivot pins 64, 66 are coaxial and are positioned on the opposite ends of the louver off-center relative to the width of the louver and slightly closer to the first longitudinal edge 60 of the louver than the second longitudinal edge 62 of the louver. In the preferred embodiment, the pivot pins 64, 66 of each louver are the opposite ends of a rod 68 secured to one side of the louver 44 in the off center position relative to the width of the louver. The opposite ends of the rod 68 thereby form the two pivot pins 64, 66 projecting longitudinally from the opposite ends 56, 58 of the louver. Alternatively, the pivot pins may be individual pins projecting from the opposite ends of the louver, may be formed integrally with the louver or may be formed in other equivalent manners. As described above, each of the louvers 44 of the plurality of louvers has a simplistic construction comprised of the basic component parts of the rectangular louver and a pair of pivot pins projecting from the longitudinally opposite ends of the louver.

Each of the plurality of louvers 44 are mounted in the interior volume 24 of the cooker base 12 by their opposite first 64 and second 66 pivot pins. The first 64 and second 66 pivot pins are received and supported in the half circle indentations 50 of the shoulders 46 mounted in the base interior on the front wall 16 and rear wall 18. The pivot pins 64, 66 of each of the louvers 44 resting in the half circle indentations 50 of the shoulders 46 enables each of the louvers to pivot freely relative to the base and to the other louvers about the common axis of its pivot pins. The louvers 44 are basically suspended between the front 16 and rear 18 side walls of the base by their pivot pins so that they hang in vertical or uprightly oriented positions as seen in FIG. 3 with their first longitudinal edges 60 positioned over their second longitudinal edges 62 solely by the force of gravitation. The first positions of the plurality of louvers shown in FIG. 3 where they are each oriented uprightly is employed when direct heat cooking is desired as will be explained.

With each of the louvers 44 suspended in one of the half circle indentations 50 of the shoulders 46, the plurality of louvers 44 are arranged in pairs of louvers. The louvers of each pair are spaced the first distance 52 from each other as shown in FIG. 3, and adjacent louvers of adjacent pairs are spaced the second distance 54 from each other. In the described construction of the louvers with their opposite first 64 and second 66 pivot pins being formed from a single rod 68 secured to one side of each louver, the louvers are positioned in the base interior with a first surface 70 of each louver having the rod 68 secured thereto by welding or other equivalent means opposing the first surface 70 and rod 68 of the adjacent louver of the pair. Thus, the rods and pivot pins of a pair of adjacent louvers are spaced the first distance 52 from each other and the rods and pivot pins of adjacent louvers of adjacent pairs are spaced the second distance 54 from each other. It should be understood that although the louvers 44 are shown in the drawing figures suspended by their pivot pins extending across the entire interior volume 24 of the base between the front wall 16 and rear wall 18, the louvers 44 could alternatively be repositioned extending across the entire interior volume 24 of the base between the left side wall 20 and the right side wall 22 without affecting the operation of the louvers to be explained.

The manual actuator mechanism 48 of the invention also has a simplistic structure to minimize the cost of assembling the direct and indirect cooker of the invention. As seen in FIGS. 3 and 4 and in the partial view of FIG. 5, the actuator 48 of the louvers is mounted between the left 20 and right 22 side walls of the base extending beneath the plurality of louvers 44. Of course, if the louvers 44 were repositioned extending between the left 20 and right 22 side walls, then the manual actuator 48 would also be repositioned extending between the front 16 and rear wall 18 of the base. The manual actuator 48 is basically a bar or rod that extends beneath the louvers 44 and is mounted to the cooker side walls 20, 22 for pivoting movement. In the preferred embodiment, the actuator bar is formed from a rod having several bends in its length between opposite first 74 and second 76 ends of the rod mounted in coaxially aligned respective holes 78, 80 in the left 20 and right 22 side walls of the cooker base. The base rod holes 78, 80 mount the rod between the left 20 and right 22 side walls of the cooker base for pivoting movement of the rod about a pivot axis that passes through the side wall holes. Inside the base interior volume 24 an intermediate portion 82 of the rod is formed with first 84 and second 86 bends at its opposite ends adjacent the first 74 and second 76 coaxially aligned pivot ends of the rod. The two bends 84, 86 at the opposite ends of the intermediate portion 82 cause the intermediate portion to be positioned eccentrically from the pivot axis of the opposite pivot ends 74, 76 of the rod. As an alternative to the bent rod described, the actuator bar could actually be formed from a flat elongate bar having pivot pins at opposite ends that engage in the pivot holes 76, 80 at the base side walls where an edge of the bar extending between the base side walls functions as the eccentric intermediate portion 82 of the rod described.

A plurality of rod segments bent as wedges 88 are secured to the rod intermediate portion 82. The wedges 88 are all positioned in a single plane and their number corresponds to the number of pairs of louvers 44 supported in the base interior. As seen in FIG. 3, the wedges 88 have apexes 90 that function as leading edges or start up edges of the actuator. The positions of the wedge apexes correspond to the shorter gaps or first distance 52 gaps between adjacent louvers of each pair of louvers suspended in the base interior.

One end of the rod adjacent its second pivot end 76 extends outside the base right side wall 22 from the rod pivot hole 80 and is bent at the end of the rod, thereby forming a manual handle 94 of the actuator. Manipulating the handle between first and second positions, the first position shown in FIGS. 3 and 5 and the second position shown in FIGS. 2 and 4, causes the actuator to pivot between the first and second positions in the base interior volume 24 and in turn causes the plurality of louvers 44 to move between their first positions shown in FIGS. 3 and 5 and their second positions shown in FIGS. 2 and 4.

With the louvers 44 and the manual actuator 48 assembled into the base interior volume 24, the grill grid cooking surface 36 is positioned in the base interior volume supported on the peripheral edge 40 of the base as shown in FIG. 1. This positions the louvers 44 and the manual actuator 48 in the interior volume over the gas burner heat source 26 and beneath the grill grid cooking surface 36.

In operation of the direct and indirect outdoor cooker of the invention, when it is desired to provide direct heat from the heat source 26 to foods supported on the grill grid cooking surface 36, the handle 94 of the actuator is positioned in its first position shown in FIGS. 3 and 5. This causes the actuator bar edge formed by the rod intermediate portion 82 as well as the wedges 88 of the actuator to be moved to positions in the interior volume of the base where they are completely disengaged from contact with the louvers 44. Thus, the louvers 44 are free to pivot by force of gravitation alone to their first relative positions. In the first positions the louvers 44 are suspended by their pivot pins 64, 66 between the opposite front and rear walls of the cooker and are oriented uprightly with their first longitudinal edges 60 over their second longitudinal edges 62 as shown in FIG. 3. This leaves gaps between adjacent louvers of each pair and gaps between adjacent pairs of louvers with the first longitudinal edges 60 of each louver of a pair being spaced the first distance 52 apart and the first longitudinal edges 60 of adjacent louvers of adjacent pairs being spaced the second distance 54 apart. This provides the greatest spacing between the louvers 44 and enables the heat from the heat source 26 to pass freely between the uprightly oriented louvers to the food supported on the grill cooking surface 36 for direct cooking of the food.

Should it be desired to change the grill from direct cooking to indirect cooking, the manual handle 94 of the actuator is moved from its first position shown in FIGS. 3 and 5 to its second position shown in FIGS. 2 and 4. This causes the bar formed by the intermediate portion 82 of the actuator rod to move in the interior of the cooker base from its first position shown in FIG. 5 to its second position shown in FIG. 4. As the bar moves from its first position to its second position, the wedges 88 on the bar come into contact with the bottom, second longitudinal edges 62 of the louvers initiating the movement of the second longitudinal edges of adjacent louvers of each pair of louvers away from each other and initiating pivoting movement of the louvers from their first positions toward their second positions. As the rotation of the handle from its first position to its second position continues, sliding movement of the wedges 88 across the second longitudinal edges 62 of the louvers continues to cause the louvers to pivot away from each other and move toward their second positions. Subsequently, the wedges 88 pass completely over the second longitudinal edges 62 of the louvers and the rod intermediate portion 82 forming the bar comes into contact with the second longitudinal edges of the louvers as the manual handle 94 is continued to be moved toward its second position. The engagement of the rod intermediate portion 82 with the second longitudinal edges 62 of the louvers now causes the edges of adjacent pairs of louvers to continue to pivot away from each other and toward the second positions of the plurality of louvers. When the handle reaches its second position shown in FIG. 4 the plurality of louvers 44 have been moved to their second positions also shown in FIG. 4 and the rod intermediate portion 82 holds the louvers in their second relative positions. In the second positions adjacent louvers of each pair of louvers are oriented at angles with the included angle between the louvers positioned below the pair of louvers. Adjacent louvers of adjacent pairs of louvers are also oriented at angles with the included angle between the louvers positioned above the louvers. As seen in FIG. 4, the angles are arranged in an alternating pattern above and below the plurality of louvers across the base interior volume from the left side wall 20 to the right side wall 22. In the second, angled positions of the louvers the first longitudinal edges 60 of the louvers are spaced at first and second distances from each other and the second longitudinal edges 62 of the louvers are spaced at first and second distances from each other leaving gaps between adjacent louvers. The gaps permit a restricted amount of direct heat to pass upwardly between the louvers and also allow juices from cooking food to pass downwardly over the angled louvers and through the gaps between the louvers first and second longitudinal edges. The majority of the heat produced by the grill heat source is obstructed by the widths of the plurality of louvers and thereby the food supported on the grill cooking surface 36 is heated by indirect heat from the heat source 26.

The plurality of louvers and their actuator described above provide an inexpensive to manufacture and easily assembled mechanism for enabling an outdoor cooker to operate with direct or indirect heating of cooking food. The simplified constructions of a plurality of louvers and the actuator can easily be incorporated into an outdoor cooker during its manufacture and can easily be retrofit to an existing outdoor cooker.

While the present invention has been described by reference to specific embodiments, it should be understood that modifications and variations of the invention may be constructed without departing from the scope of the invention defined in the following claims.

What is claimed:

1. A cooker comprising:

a base having a bottom wall and at least one sidewall extending upwardly from the bottom wall and around the bottom wall, the bottom wall and sidewall containing an interior volume of the base that is dimensioned to accommodate a source of heat;

a plurality of louvers supported on the sidewall extending side by side above and across the base bottom wall, each of the louvers having opposite first and second ends and a longitudinal length between the first and second ends, each of the louvers having first and second pivot pins projecting from the respective first and second ends and the first and second pivot pins are supported by the base sidewall for free pivoting movement of the pivot pins and free pivoting movement of the plurality of louvers relative to the base and relative to each other.

2. The cooker of claim 1, wherein:

each of the louvers has opposite sides and a rod is secured to one side of each of the louvers, the rod extends across the longitudinal length of the louver with opposite ends of the rod projecting outwardly from the opposite first and second ends of the louver thereby forming the opposite first and second pivot pins of the louver.

3. The cooker of claim 2, wherein:

each of the louvers has a width across the length of the louver and the rod of each louver is secured to the one side of the louver in an off center position of the rod relative to the louver width.

4. The cooker of claim 1, wherein:

the plurality of louvers are supported by the base sidewall above the interior volume of the base that is dimensioned to accommodate the source of heat and a grill is supported by the base sidewall in a position above the plurality of louvers and above the base interior volume.

5. The cooker of claim 1, wherein:

each louver of the plurality of louvers is rectangular and has a width across the length of the louver with first and second longitudinal edges on opposite sides of the width, and the plurality of louvers are pivotable between first and second positions relative to the base bottom wall where in the first positions the plurality of louvers are oriented uprightly with their first longitudinal edges positioned over their second longitudinal edges and in the second positions the plurality of louvers are oriented at angles between adjacent louvers.

6. The cooker of claim 5, wherein:

the angles between adjacent louvers alternate in positions above and below pairs of adjacent louvers across the plurality of louvers.

7. The cooker of claim 1, wherein:

the plurality of louvers are arranged in pairs where the pivot pins of adjacent louvers of each pair of louvers are spaced a first lateral distance apart and the pivot pins of adjacent louvers of adjacent pairs of louvers are spaced a second lateral distance apart, and the first distance is smaller than the second distance.

8. The cooker of claim 1, wherein:

each of the louvers of the plurality of louvers is rectangular and has a width across the length of the louver with first and second longitudinal edges on opposite sides of the width, and the plurality of louvers are pivotable between first and second positions relative to the base bottom where in the first positions the plurality of louvers are oriented uprightly with their first longitudinal edges positioned over their second longitudinal edges and where in the second positions the plurality of louvers are oriented at angles relative to the base bottom wall, and the plurality of louvers are arranged in pairs where in the first positions the first longitudinal edges of adjacent louvers of each pair are spaced a first distance apart and in the second positions the first longitudinal edges of adjacent louvers of each pair are spaced a second distance apart, and the first distance is larger than the second distance.

9. The cooker of claim 5, wherein:

a bar is supported by the sidewall extending transverse to and below the plurality of louvers and the bar is moveable between first and second positions of the bar relative to the plurality of louvers where in the first position of the bar it is displaced from the plurality of louvers and in the second position of the bar it engages with the plurality of louvers and holds the plurality of louvers in their second positions.

10. The cooker of claim 9, wherein:
the bar is supported by the sidewall for pivoting movement between the first and second positions and a handle is mounted to the base and is operatively connected to the bar to pivot the bar between its first and second positions in response to manual manipulation of the handle.

11. The cooker of claim 5, wherein:
the plurality of louvers are moved to their first positions relative to the base and held in their first positions solely by gravitation.

12. The cooker of claim 1, wherein:
each of the louvers has a width transverse to the length of the louver and the first and second pivot pins project from the opposite first and second ends of the louvers in off center positions of the first and second pivot pins relative to the widths of the louvers.

13. A cooker comprising:
a base having a bottom wall and at least first and second sidewalls extending upwardly from opposite sides of the bottom wall and defining an interior volume of the base above the bottom wall and between the first and second sidewalls that is dimensioned to accommodate a source of heat;
a grill supported on the first and second sidewalls, the grill having a cooking surface; and,
a plurality of louvers supported on the first and second sidewalls with the plurality of louvers extending side by side above and across the entire base bottom wall and below and across the entire cooking surface of the cooker, each of the louvers having opposite first and second ends and a longitudinal length between the first and second ends, each of the louvers having first and second pivot pins projecting from the respective first and second ends and the first and second pivot pins are supported by the base first and second sidewalls for pivoting movement of the plurality of louvers relative to the base.

14. The cooker of claim 13, wherein:
a rod is secured to each of the louvers with the rod extending across the longitudinal length of the louver and with opposite ends of the rod projecting from the opposite first and second ends of the louver and thereby defining the opposite first and second pivot pins of the louver.

15. The cooker of claim 13, wherein:
each of the louvers has a width transverse to the length of the louver and the first and second pivot pins project from the opposite first and second ends of the louvers in off center positions of the first and second pivot pins relative to the widths of the louvers.

16. The cooker of claim 13, wherein:
each of the louvers has a width transverse to the length of the louver and first and second longitudinal edges on opposite sides of the width, and the plurality of louvers are pivotable between first and second positions relative to each other where in the first positions the louvers are oriented uprightly with their first longitudinal edges over their second longitudinal edges and in the second positions the louvers are oriented at angles between adjacent louvers.

17. The cooker of claim 16, wherein:
the angles between adjacent louvers are arranged in an alternating pattern above and below pairs of adjacent louvers.

18. The cooker of claim 13, wherein:
the plurality of louvers are arranged in pairs where the pivot pins of adjacent louvers of each pair of louvers are spaced a first lateral distance apart and the pivot pins of adjacent louvers of adjacent pairs of louvers are spaced a second lateral distance apart, and the first distance is smaller than the second distance.

19. The cooker of claim 13, wherein:
each of the louvers has a width transverse to the length of the louver and first and second longitudinal edges on opposite sides of the width, and the plurality of louvers are pivotable between first and second positions of the louvers relative to each other where in the first positions the plurality of louvers are oriented uprightly with their first longitudinal edges positioned over their second longitudinal edges and where in their second positions the plurality of louvers are oriented at angles relative to the base bottom wall, and the plurality of louvers are arranged in pairs where in the first positions the first longitudinal edges of adjacent louvers of each pair are spaced a first distance apart and in the second positions the first longitudinal edges of adjacent louvers of each pair are spaced a second distance apart, and the first distance is larger than the second distance.

20. The cooker of claim 16, wherein:
a bar is supported by the base traversing below the plurality of louvers and the bar is moveable between first and second positions of the bar relative to the plurality of louvers where in the first position the bar is displaced from the plurality of louvers and in the second position the bar engages with the plurality of louvers and holds the plurality of louvers in their second positions.

21. The cooker of claim 20, wherein:
a handle outside the base is operatively connected to the bar and moves the bar between the first and second positions of the bar in response to manual movement of the handle.

22. The cooker of claim 16, wherein:
the plurality of louvers are pivoted to their first positions by gravitation.

23. The cooker of claim 13, wherein:
each of the louvers has a width transverse to the length of the louver and the first and second pivot pins project from the first and second ends of the louvers in off center positions of the first and second pivot pins relative to the widths of the louvers.

24. A cooker comprising:
a base having a bottom wall and at least first and second sidewalls extending upwardly from opposite sides of the bottom wall and defining an interior volume of the base above the bottom wall and between the first and second sidewalls that is dimensioned to accommodate a source of heat;
a grill supported on the first and second sidewalls, the grill having a cooking surface;
a plurality of louvers supported on the first and second sidewalls extending side by side above and across the base bottom wall and below and across the cooking surface of the grill, each of the louvers having a longitudinal length between opposite first and second ends of the louver and a width across the length of the louver with first and second longitudinal edges on opposite sides of the width, each of the louvers having first and second pivot pins projecting from the respective first and second ends of the louver and the first and second pivot pins are supported by the respective first and second sidewalls of the base for pivoting movement of the louvers between first and second positions of the louvers relative to the base bottom wall where in the first positions the louvers are oriented uprightly with their first longitudinal edges over their second longitudinal edges and where in their second positions the plurality of louvers are oriented at angles relative to the base bottom wall, and the plurality of louvers are positioned relative to each other where the louvers do not overlap each other in both the first and second positions of the louvers and leave gaps between the louvers in both the first and second positions of the louvers.

25. The cooker of claim 24, wherein:

a rod is secured to each of the louvers with the rod extending across the longitudinal length of the louver and with opposite ends of the rod projecting from the opposite first and second ends of the louver and thereby defining the opposite first and second pivot pins of the louver.

26. The cooker of claim 24, wherein:

the first and second pivot pins project from the opposite first and second ends of the louvers in off center positions of the first and second pivot pins relative to the widths of the louvers.

27. The cooker of claim 24, wherein:

the plurality of louvers are arranged in pairs where the pivot pins of adjacent louvers of each pair of louvers are spaced a first lateral distance apart and the pivot pins of adjacent louvers of adjacent pairs of louvers are spaced a second lateral distance apart, and the first distance is smaller than the second distance.

28. The cooker of claim 24, wherein:

in the second positions of the louvers pairs of adjacent louvers form angles between the louvers and the angles between the adjacent louvers are arranged in a pattern in which the angles alternate in positions above and below the plurality of louvers.

29. The cooker of claim 24, wherein:

each of the louvers of the plurality of louvers is rectangular and has a width across the length of the louver with first and second longitudinal edges on opposite sides of the width, and the plurality of louvers are pivotable between first and second positions relative to the base bottom where in the first positions the plurality of louvers are oriented uprightly with their first longitudinal edges positioned over their second longitudinal edges and where in the second positions the plurality of louvers are oriented at angles relative to the base bottom wall, and the plurality of louvers are arranged in pairs where in the first positions the first longitudinal edges of adjacent louvers of each pair are spaced a first distance apart and in the second positions the first longitudinal edges of adjacent louvers of each pair are spaced a second distance apart, and the first distance is larger than the second distance.

30. The cooker grill of claim 24, wherein:

a bar is supported by the base traversing below the plurality of louvers and the bar is moveable between first and second positions of the bar relative to the plurality of louvers where in the first position the bar is displaced from the plurality of louvers and in the second position the bar engages with the plurality of louvers and holds the plurality of louvers in their second positions.

31. The cooker of claim 30, wherein:

a handle outside the base is operatively connected to the bar and moves the bar between the first and second positions of the bar in response to manual movement of the handle.

32. The cooker of claim 24, wherein:

the plurality of louvers are pivoted to their first positions by gravitation.

* * * * *